United States Patent
Wojcik et al.

(10) Patent No.: US 7,484,477 B2
(45) Date of Patent: Feb. 3, 2009

(54) LEASH ANCHOR AND CONTAINER SUPPORT

(76) Inventors: Mark Wojcik, 1740 N. Marshfield, No. 7, Chicago, IL (US) 60622; Justin Orenic, 661 Glenwood Ave., Joliet, IL (US) 60435

( * ) Notice: Subject to any disclaimer, the term of this patent is extended or adjusted under 35 U.S.C. 154(b) by 0 days.

(21) Appl. No.: 10/425,687

(22) Filed: Apr. 29, 2003

(65) Prior Publication Data
US 2004/0216697 A1 Nov. 4, 2004

(51) Int. Cl.
*A01K 1/04* (2006.01)
(52) U.S. Cl. ............... 119/787; 119/791; 119/51.01
(58) Field of Classification Search ............ 119/786, 119/787, 788, 791, 61, 51.5, 51.01, 61.57; D30/154
See application file for complete search history.

(56) References Cited

U.S. PATENT DOCUMENTS

| | | | | |
|---|---|---|---|---|
| 601,952 | A * | 4/1898 | Day ............................ | 119/782 |
| 812,157 | A * | 2/1906 | Thompson .................... | 119/69 |
| 2,484,263 | A | 10/1949 | Atkinson ..................... | 119/121 |
| 2,584,301 | A | 2/1952 | Sinclair ........................ | 119/61 |
| 2,887,988 | A | 5/1959 | Cottongim .................... | 119/51 |
| 3,810,445 | A | 5/1974 | Stadler ......................... | 119/26 |
| 4,011,951 | A * | 3/1977 | Boyer ....................... | 211/85.21 |
| 4,205,629 | A * | 6/1980 | Wix ............................ | 119/51.5 |
| 4,334,503 | A * | 6/1982 | Carey, Jr. .................... | 119/786 |
| 4,546,730 | A | 10/1985 | Holland ....................... | 119/117 |
| 4,796,566 | A | 1/1989 | Daniels ....................... | 119/124 |
| 5,022,351 | A | 6/1991 | Daniels ....................... | 119/124 |
| 5,031,577 | A | 7/1991 | Flugger ....................... | 119/117 |
| 5,088,448 | A * | 2/1992 | Gladding ..................... | 119/786 |
| 5,148,626 | A * | 9/1992 | Haake, Sr. ..................... | 43/121 |
| 5,161,487 | A * | 11/1992 | Miller .......................... | 119/786 |
| 5,165,365 | A | 11/1992 | Thompson .................... | 119/61 |
| 5,353,747 | A * | 10/1994 | Fain ............................ | 119/780 |
| 5,732,659 | A | 3/1998 | Wiggins ....................... | 119/787 |
| 6,401,656 | B1 * | 6/2002 | Adkisson .................. | 119/51.01 |

FOREIGN PATENT DOCUMENTS

WO    WO 02/28170 A1 *  4/2002

* cited by examiner

*Primary Examiner*—T. Nguyen
(74) *Attorney, Agent, or Firm*—Trexler, Bushnell, Giangiorgi, Blackstone & Marr, Ltd.

(57) ABSTRACT

A combination leash anchor and container support. The combination includes a securement member for securely attaching the combination to the ground, a leash fastener for coupling a dog leash, for example, to the securement member, and a container support for holding containers, such as food or water bowls. The securement member, which has a ground boring means attached thereto, and the container support are preferably constructed in one-piece and the container support is designed so that it can be grasped to manually drive the combination into the ground without the need for any tools or strenuous labor. The combination can be removed from the ground and relocated in a similar manner. Removable bowls can be used with the combination in order to facilitate cleaning and refilling at a location away from the combination, if desired.

9 Claims, 4 Drawing Sheets

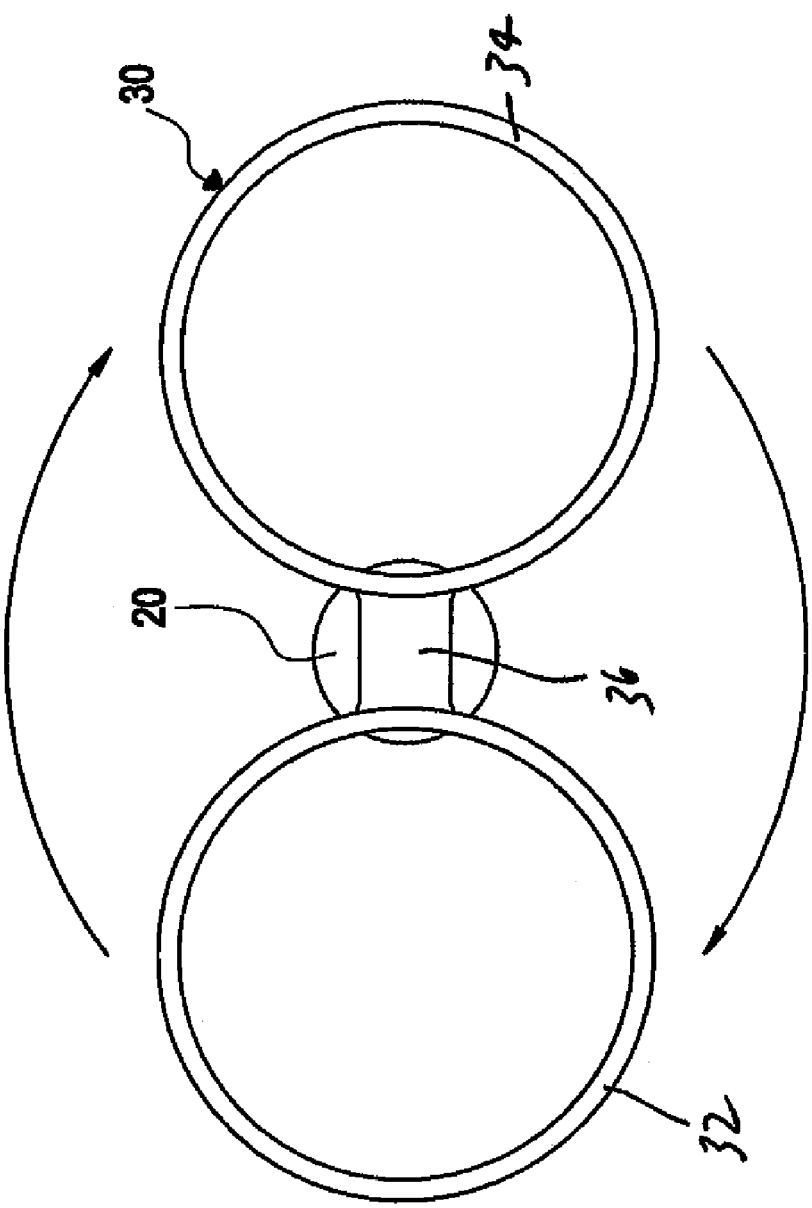

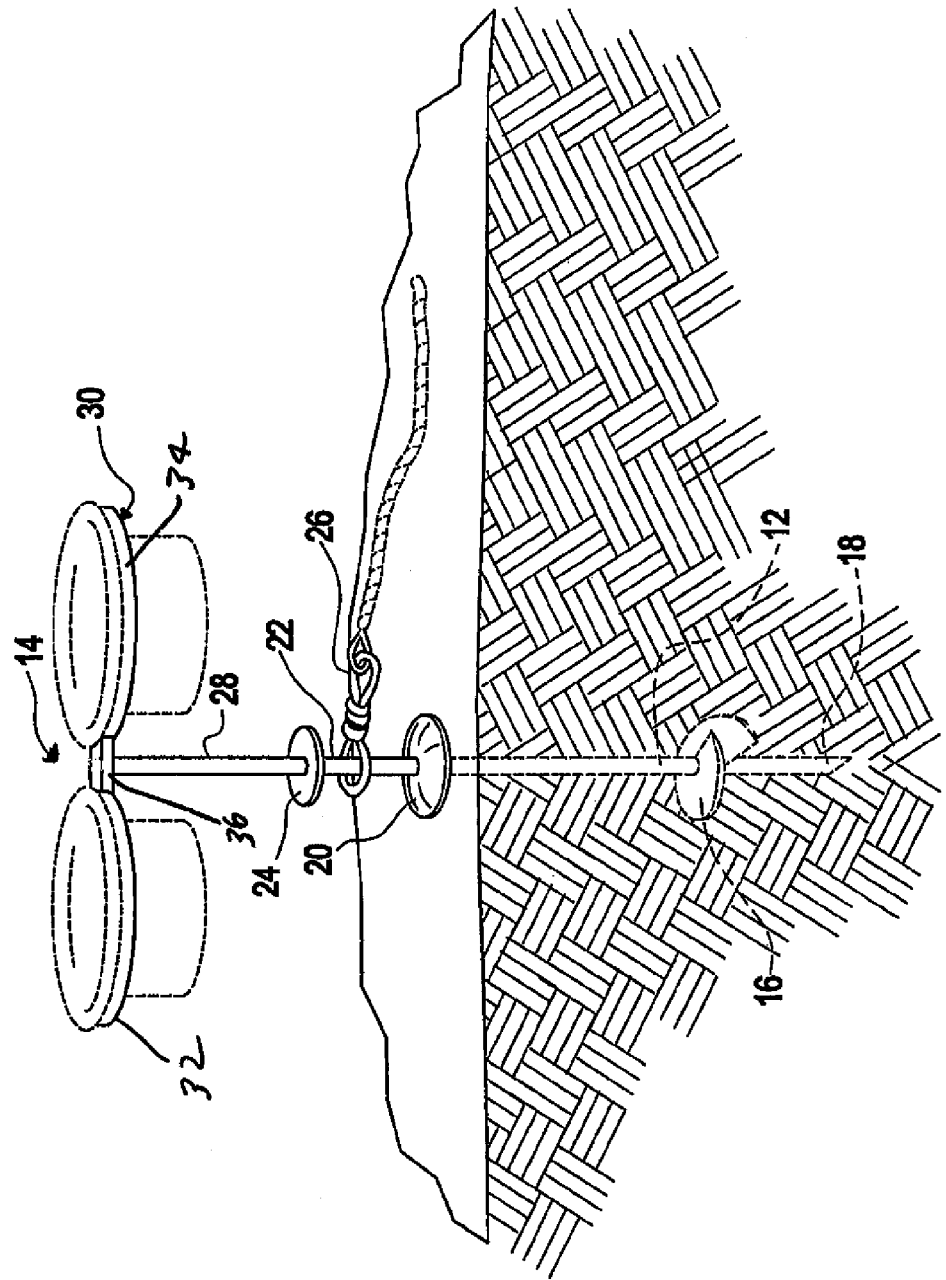

LEASH ANCHOR AND CONTAINER SUPPORT

BACKGROUND OF THE INVENTION

In general, this invention relates to a combination for anchoring a leash and providing a support for containers. More specifically, the invention relates to a novel device for anchoring an animal leash, such as a dog leash, and also provides a practical support for one or more containers, such as food and/or water bowls. The device can be easily anchored to and removed from the ground by hand and can hold a container in a manner which effectively presents the contents of the container to the animal, while minimizing the possibilities for contamination of the contents of the container.

There have been several attempts in the past at providing a combined leash anchor and bowl or bowl holder for animals, but all such past attempts have been less than optimal. Ideally, a combined leash anchor and container or container support would provide a secure and stable attachment to the ground, but be easily insertable and removable without the need for tools or strenuous labor. It is not uncommon for the user of such a device to repeatedly move the device from one location to another, in a back yard for example. If relocation of the device is difficult, or due to the need for tools, is likely to damage the device, it greatly detracts from overall attributes of owning such a device. In addition, it is most desirable to provide a leash fastener on such a combination that will minimize or eliminate the possibility of the leash becoming wrapped around the device, which could cause injury to the leashed animal and render the device useless. The leash fastener should also prohibit the leash from interfering with the container or container support. Also, this type of device would ideally include a support for one or more containers, for water and food or the like, which would elevate the container above the ground. Elevation of the container above the ground minimizes the possibility that the contents of the container will become contaminated by insects or rodents. It is believed that elevation of the container above the ground also promotes good digestion of the contents of the container by controlling the body position of the animal during the time of eating or drinking. The ability to easily remove and replace the containers for refilling or cleaning at a remote location is also an important feature in the overall appeal of owning a combined leash anchor and container support of this kind. Finally, it is most desirable to provide a device which has unitary construction for strength, durability and to reduce the possibility that the multiple pieces will become separated or lost.

The following examples all suffer from lacking one or more of the desired attributes discussed above. U.S. Pat. No. 2,484,263, for example, discloses a leash stake and bowl combination which needs to be driven into the ground by a sledge hammer or the like and positions the bowl flush with the ground. U.S. Pat. No. 6,401,656 discloses a multi-piece fixed containers device which also requires a separate tool for driving the securement member into the ground. In addition, the leash is attached to the device in such a manner which is likely to cause the apparatus to be unstable and cause the leash to become entangled with other parts of the apparatus. Finally, U.S. Pat. No. 4,456,730 discloses a device which, among other disadvantages, requires a separate extension pole to prevent interference between the leash and the rest of the device and does not include means for elevating the bowl above the ground. Nor does it appear that the containers disclosed in the '730 patent would be easy to remove or replace.

OBJECTS AND SUMMARY OF THE INVENTION

Accordingly, it is a general objective of the present invention to provide a combination leash anchor and container support which overcomes the problems associated with the above-discussed devices.

It is a more specific objective of the present invention to provide a combination leash anchor and container support which can be easily inserted and removed from the ground without the need for tools or strenuous labor.

It is another specific objective of the present invention to provide a combination leash anchor and container support which, once attached to the ground, remains secure and stable.

It is another specific objective of the present invention to provide a combination leash anchor and container support which is of unitary construction.

It is another specific objective of the present invention to provide a combination leash anchor and container support which minimizes or eliminates the possibility of the leash becoming wrapped around the device or from interfering with the containers held by the device.

It is another specific objective of the present invention to provide a combination leash anchor and container support which elevates the container above the ground to minimize the possibility of accidental spilling or contamination of the contents of the containers held by the device and promotes proper digestion by the animal using the device.

It is another specific objective of the present invention to provide a combination leash anchor and container support which provides means for easily removing and replacing the containers held by the device.

Summarily stated, the present invention comprises a combination leash anchor and container support for use with a dog leash or the like. The combination includes a securement member for securely attaching the combination to the ground, a leash fastener for coupling a leash to the securement member, and a container support assembly for holding containers on the combination. The securement member, which has a ground boring means attached thereto, and the container support assembly are preferably constructed in one-piece and the container support assembly can be grasped to manually drive the combination into the ground without the need for any tools or strenuous labor. The combination can be removed from the ground and relocated in a similar manner. Removable bowls can be used with the combination in order to facilitate cleaning and refilling.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following descriptions taken in connection with the accompanying drawings in which like reference numerals identify like elements, and in which:

FIG. 3 is a top view the combination leash anchor and container support of the present invention with an arrow indicating the direction of rotation for securing the device to the ground;

FIG. 4 is a side elevational view of the combination leash anchor and container support of the present invention secured to the ground and having containers held thereby.

DETAILED DESCRIPTION OF THE INVENTION

Figure 1:
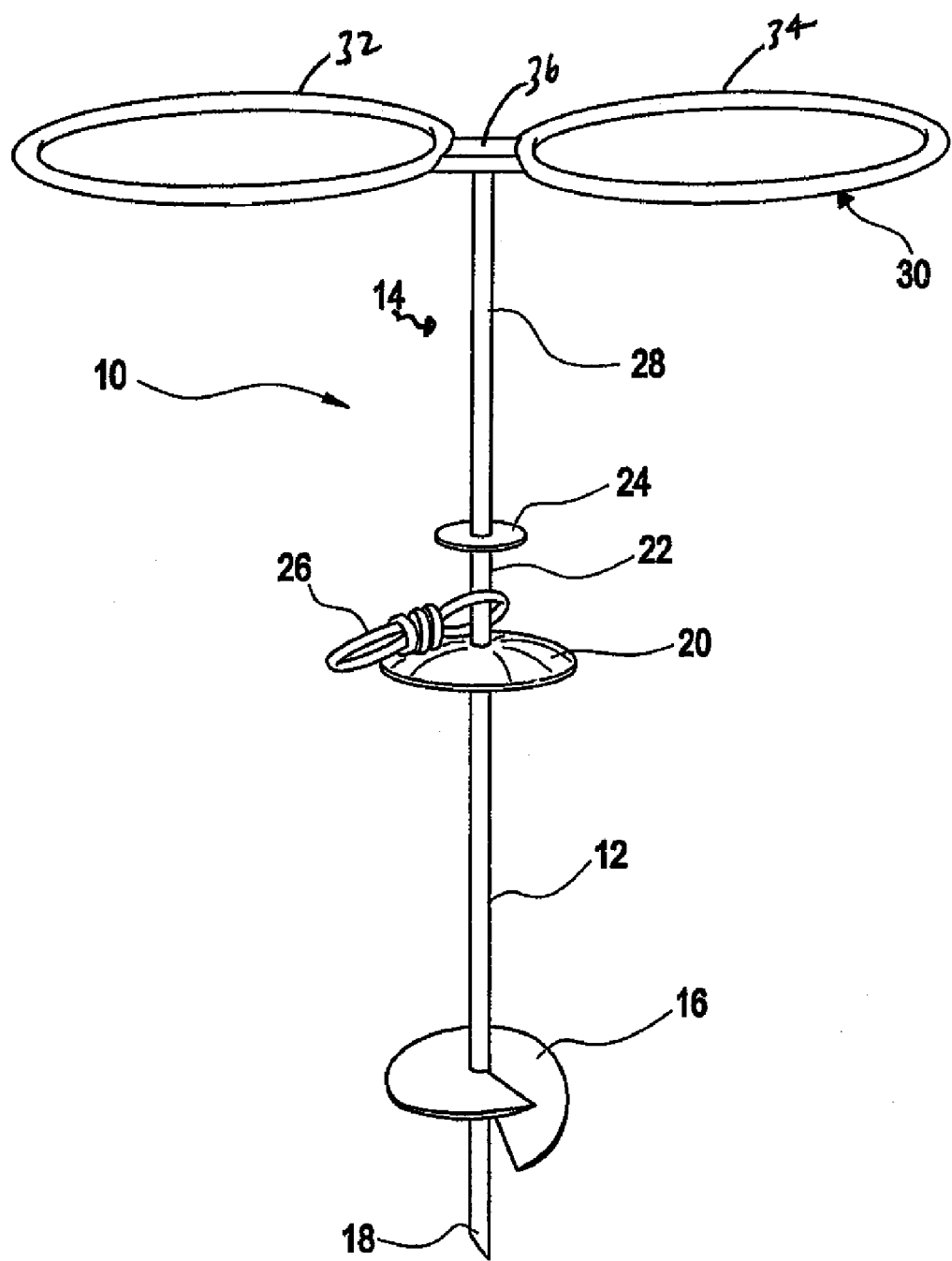
FIG. 1 is a perspective view of the combination leash anchor and container support of the present invention.
Figure 2:
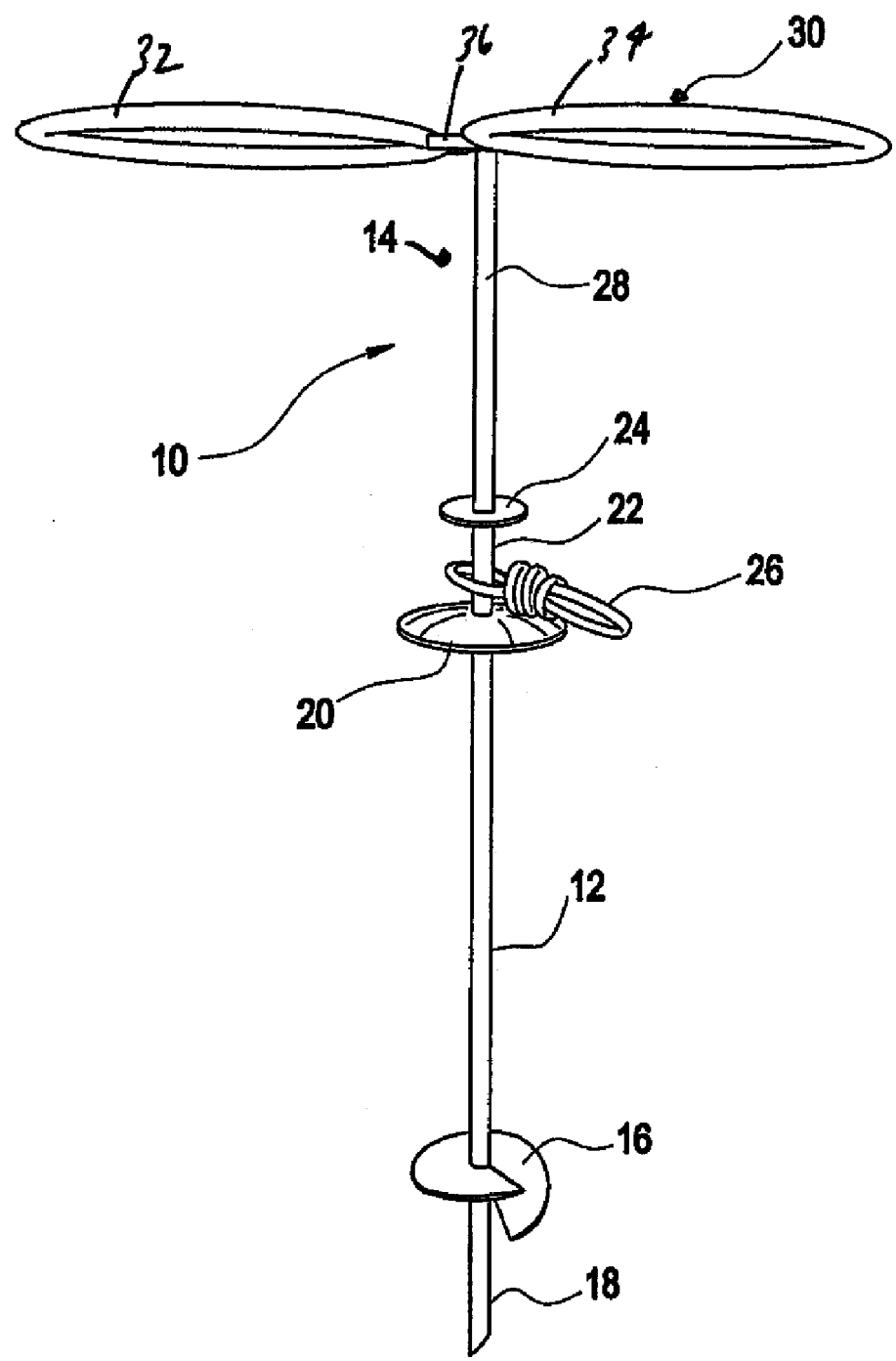
FIG. 2 is a side elevational view of the combination leash anchor and container support of the present invention.

While the invention will be described in connection with a preferred embodiment, it will be understood that it is not intended to limit the invention to that embodiment. On the contrary, it is intended to cover all alternatives, modifications and equivalents as may be included within the scope and spirit of the invention.

Turning now to the drawings, there is shown a combination leash anchor and container support 10 which is intended for use with an animal leash for tethering an animal and providing a support for one or more containers from which the tethered animal will eat or drink. It is anticipated that the combination leash anchor and container support 10 will primarily be used to tether a dog, be used in a yard or field and support food and water bowls for the dog, but it should be clearly understood that the combination 10 could also be used with a variety of animals and that the number of container supports or the contents of the containers should in no instance be viewed as a limitation of the scope of the invention.

The combination leash anchor and container support 10 generally comprises a securement member 12, preferably in the form of a rod, and a container support 14 formed integral with the securement member 12 to form a one-piece, unitary body.

The securement member 12 further includes a ground boring member 16, preferably in the form of a helical auger, to facilitate insertion and removal of the combination 10 from the ground, as will be thoroughly discussed below. Ideally, the ground boring means 16 is fixedly attached to the securement member 12 by means of welding or the like and is located nearer a lower end 18 of the securement member 12. In a preferred embodiment, the lower end 18 is also sharpened to facilitate ground entry.

It is also desirable to provide the securement member 12 with a stabilizer 20, shown in the Figures in the form of a disc or plate cupped in the downward direction, attached near an upper end 22 of the securement member 12, also preferably by welding or the like. For the purpose which will become clear upon a complete understanding of the invention, the top of the securement member is also shown to be provided with a cap 24 which, like the auger 16 and the stabilizer 20, is preferably welded to the securement member 12.

As best understood by reference to FIG. 4, a leash fastener 26 in the form of a double-clevis is rotationally coupled to the upper end of the securement member 22 at a location below the cap 24 and above the stabilizer disc or plate 20. The double-clevis design of the leash fastener 26 allows for 360 degree rotation about a longitudinal axis of the securement member 12 as well as 360 degree rotation about an axis transverse to the longitudinal axis of the securement member 12.

The container support assembly 14, which is preferably fixedly coupled to the securement member 12 at the cap 24, includes a height extension member 28 and a container holder assembly 30. Although it is contemplated that the container holder assembly 30 might be used in a variety of different styles depending on the number and exterior shapes and configurations of the one or more containers which are to be supported thereby, the container holder assembly 30 is shown in the Figures in the form of two diametrically opposed circular ring supports 32, 34 coupled together and separated by an attachment plate 36, which in turn is fixedly attached to the upper end of the height extension member 28. The height extension member 28 is fixedly attached to the upper end 22 of the securement member 12, preferably by welding or the like.

As can be easily envisioned with reference to the arrows shown on FIG. 3, the combination leash anchor and container support 10 can be manually driven into the ground without the need for any tools or strenuous labor by gasping the container holder assembly 30 and twisting the combination 10 while applying a downward force. Assisted by the ground boring auger 16 and the sharpened edge of the lower end 18 of the securement member 12, the combination 10 will be easily driven into the ground until the stabilizer plate 20 comes into contact with the surface of the ground as illustrated in FIG. 4. Removal of the combination 10 from the installed condition illustrated in FIG. 4 simply requires the grasping and twisting of the container holder assembly 30 in the opposite direction while at the same time applying an upward force.

Repeated installations and removals can be easily effected as described when it is desired to move the combination 10 from one location to another, as will often likely be the case, without damage to the combination from contact with tools and without the need to disassemble and reassemble multiple parts.

As best understood with reference to FIG. 4, a leashed animal tethered to the combination 10 at the leash fastener 26 will be securely restrained by the length of the leash, but free to travel 360 degrees around the combination 10. The limit on the range of travel of the leash fastener 26 on the upper end 22 of the securement member 12 created by the cap 24 and the stabilizer 20 acts to maintain the point of attachment near the surface of the ground which, in turn, minimizes the possibility of the leash becoming wrapped around other portions of the combination 10 and, in together with the stabilizer 20, keeps to a minimum any torsional forces that would otherwise tend to cause the combination 10 to tilt or loosen the ground attachment.

Again with reference to FIG. 4, it can be appreciated that the elevated position of the container holder assembly 30 allows the food and water containers to be suspended above the surface of the ground and away from the possibility of contamination from insects, rodents and undesirable items on the ground. Elevation of the containers also reduces the possibility of accidental spilling of the containers or the possibility that an animal would step in the containers. Also, because the animal using the combination 10 will be standing when accessing the containers held by the container holder assembly 30, better digestion of the contents of the containers will also be promoted. Also, it should be noted that the containers held by the container holder assembly 30 can be removed to facilitate refilling and cleaning away from the combination 10, if desired. This, of course, also allows the containers to be replaced if necessary without the need for replacing the entire combination 10. Finally, it should be noted that the preferred embodiment of the invention shown in the drawings includes circular container supports 32, 34 for holding containers with cylindrical exterior walls, which, when installed in the container holder assembly 30, are highly resistant to accidental removal by contact with the animal or animal's leash as a result of the need to apply a direct vertical force to remove the container from the container holder assembly 30.

While particular embodiments of the invention have been shown and described in detail above, it will be obvious to those skilled in the art that changes and modification of the present invention in its various aspects may be made without departing from the invention in its broader aspects, some of which changes and modifications being matters of routine engineering or design, and others being apparent only after study and analysis.

We claim:

1. A combination leash anchor and container support for use with a dog leash or the like comprising:
   a vertical securement member having a top end and a bottom end, said bottom end in use being mounted into the ground;
   a leash fastener rotationally coupled to and operatively associated with the securement member for securing a leash to the securement member; and
   a container support assembly including a vertical extension member, an attachment plate and at least one container support, said vertical extension member having a top end and a bottom end, said bottom end of said vertical extension member rigidly and permanently coupled to and extending from said top end of said securement member during insertion of said bottom end of said securement member into the ground and during removal of the securement member from the ground, said attachment plate rigidly and permanently coupled to the top end of the extension member during insertion of said bottom end of said securement member into the ground and during removal of the securement member from the ground, and said container support rigidly and permanently coupled to and extending from said attachment plate in a substantially horizontal direction and located above the leash fastener during insertion of said bottom end of said securement member into the ground and during removal of the securement member from the ground for suspending one or more removable containers and providing unobstructed access to said one or more removable containers at all times in order to promote feeding and watering and facilitate removal and replacement of said one or more containers, the container support is axially offset from the vertical securement member by way of the attachment plate so that the container support can be manually grasped to impart and transfer torque onto the vertical securement member to rotate and drive the bottom end of the securement member combination into and out of the ground.

2. The combination recited in claim 1, further comprising an auger member fixedly attached to the bottom end of the securement member to facilitate rotational insertion and extraction of the securement member into the ground.

3. The combination recited in claim 1, further comprising a stabilizing member fixedly attached to the securement member at a location on the securement member such that the stabilizing member is in contact with the ground when the combination leash anchor and container support is fully inserted in the ground.

4. The combination recited in claim 3, wherein the stabilizing member is in the form of a disc.

5. The combination recited in claim 1, wherein the leash fastener is in the form of a swivel-ring rotationally coupled to the securement member.

6. The combination recited in claim 3, wherein a range of movement of the leash fastener along the securement member in a longitudinal direction is limited by the stabilizing member on one end and a stop member on the other end, wherein said stop member is fixedly attached to the securement member and spaced vertically from said stabilizing member.

7. The combination recited in claim 1, wherein said container support is in the form of at least one circular ring.

8. The combination recited in claim 1, wherein the securement member and the container support assembly are of unitary construction.

9. The combination recited in claim 1, wherein said vertical securement member and said a container support assembly are integrally formed.

* * * * *